UNITED STATES PATENT OFFICE.

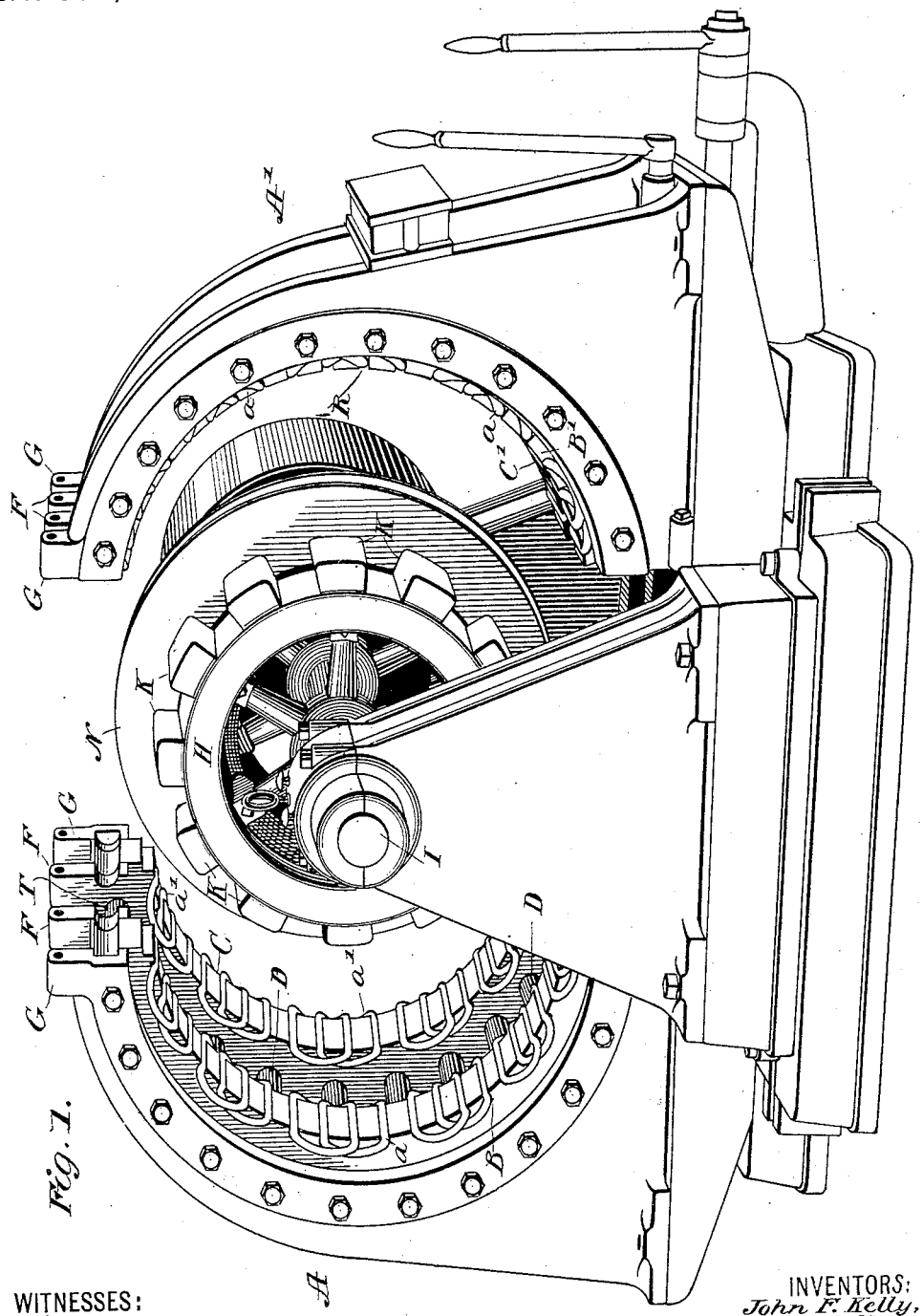

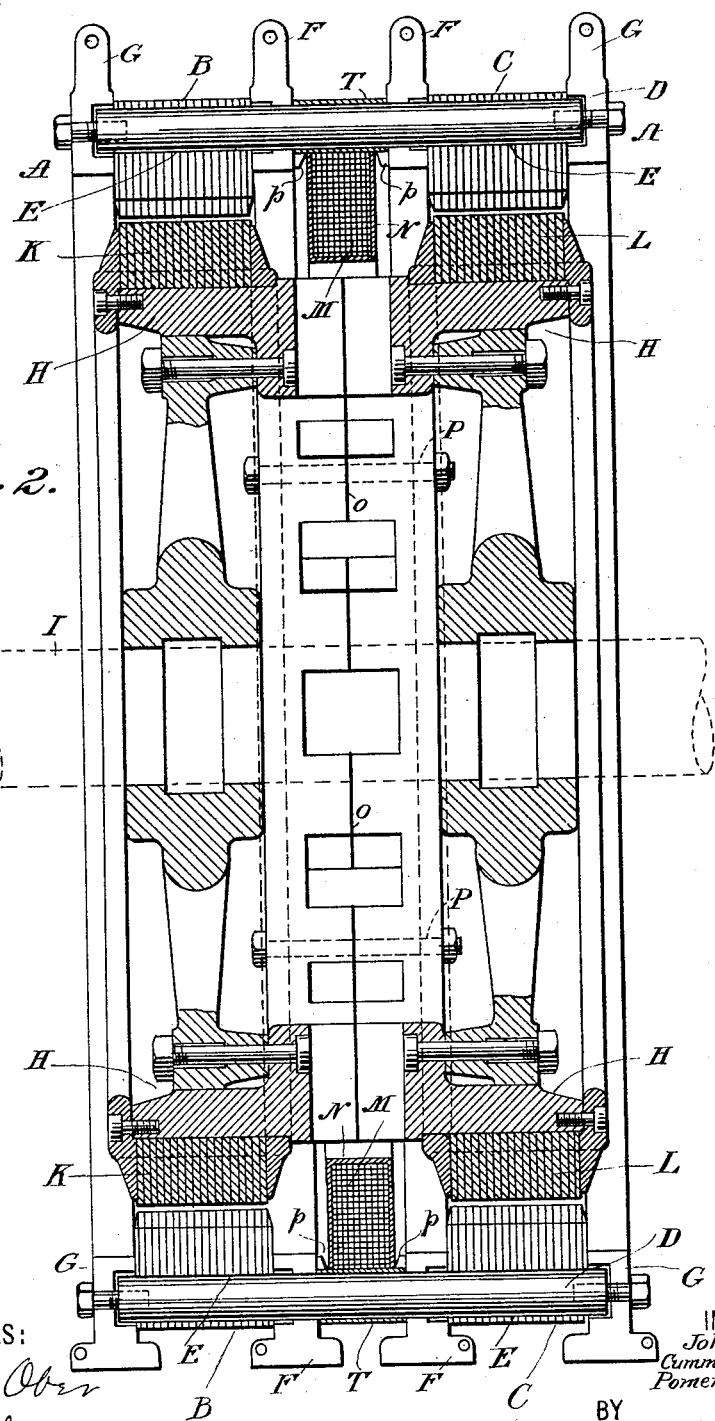

JOHN F. KELLY, CUMMINGS C. CHESNEY, AND POMEROY W. POWER, OF PITTSFIELD, MASSACHUSETTS, ASSIGNORS TO THE STANLEY ELECTRIC MANUFACTURING COMPANY, OF SAME PLACE.

DYNAMO-ELECTRIC MACHINE.

SPECIFICATION forming part of Letters Patent No. 559,584, dated May 5, 1896.

Application filed January 22, 1896. Serial No. 576,390. (No model.)

*To all whom it may concern:*

Be it known that we, JOHN F. KELLY, CUMMINGS C. CHESNEY, and POMEROY W. POWER, citizens of the United States, residing at Pittsfield, in the county of Berkshire and State of Massachusetts, have invented certain new and useful Improvements in Dynamo-Electric Machines, of which the following is a specification.

Our invention relates to improvements in dynamo-electric machines, whether generators or motors, of the general form of that shown in Patent No. 499,446, granted to William Stanley, Jr., and John F. Kelly on the 13th day of June, 1893, in which machine the armature is made up of two stationary laminated rings carrying fixed coils having between them a stationary coil for energizing an inductor which, with its projecting pole-pieces, revolves within the armature-rings.

Our invention has for its object to produce a more safe, compact, and efficient dynamo-electric machine of the kind referred to. In such machines, however, so far as our present invention is concerned, it is not necessary that there be two crowns of armature-coils, since our invention is equally applicable where there is only one crown—that is, where only one of the armature-rings carries fixed coils—in which case the other ring would have a continuous face and the corresponding end of the inductor would have a continuous polar face, so that the space between the face of that armature-ring and the face of the corresponding end of the inductor would be equally distant at all points. When only one crown of coils is used, the iron portions of the machine other than the stationary ring-carrying coils and the polar projections on the corresponding end of the inductor need not be made laminated, but may be made massive.

The following is a description of our invention, reference being had to the accompanying drawings, in which—

Figure 1 is a perspective view of a machine embodying our invention, the armature being in two sections and drawn apart, showing the internal construction of parts. Fig. 2 is a cross-section of the machine on the line of its axis when the parts are in operative position. The construction of the two halves is similar.

In the drawings, A A' represent two parts of a stationary armature carrying coils *a a'*. These parts are each made up of two semi-rings B B' and C C', made of laminated iron and fastened together in any suitable manner, so as to provide a sufficient magnetic bridge for the flux in the machine. We prefer to unite them at frequent intervals by steel or wrought-iron bolts or bars D, passing through holes E in parts F F of a supporting-framework and united to other parts G G of said framework, the parts F F being kept apart by tubes T T, but other means may be used. Within the rings B B' and C C' is the inductor H, mounted so as to revolve upon a shaft I, which carries the pulley R. The laminated pole-pieces K K and L L, attached to and projecting from the inductor, revolve in the planes of the rings B B' and C C', respectively. When the inductor is energized by the energizing-coil M, the machine will operate as a generator or as a motor, according as mechanical power is applied to the shaft or electrical energy is supplied to the coils *a a'*.

The energizing-coil M is wound on a copper bobbin N, which rests upon and is supported by the bridge between the two rings B B' and C C', being retained against lateral movement by lugs *p p* at several points. In order to utilize more fully the space between the polar projections K K and L L, as well as the space between the rings B B' and C C', so as to permit a more compact construction of the machine, resulting in its being less bulky and more efficient, we make the copper bobbin N and the coil M, which it carries, of only a little larger internal diameter than the external diameter of the central cylindrical portion of the inductor, which portion they surround when the parts are in operative position, and of less internal diameter than would be permissible if they were to be put in position around the inductor by being passed over the inductor pole-pieces K K or L L—that is, of less internal diameter than the circle described by the polar projections. In order to permit of this construction and proportion, we place the coil M and its bobbin N in position about the inductor before it is fully assembled. This may be done in several ways. We, however, prefer to do it by dividing the inductor transversely to its axis at its central point, as shown by the line of division o, and fastening the two parts together by bolts P P at several points. The coil and bobbin can then be placed in position as the two halves of the inductor are brought together. Except for the central division of the inductor, its construction may be varied as desired, so far as our present invention is concerned. This compact construction, besides reducing the bulk of the machine, materially reduces the length of wire in the coil M and also the length of the magnetic circuit, and lessens the air-gap between the inductor-core and its energizing-coil.

In all such machines as that above described there is a liability of the energizing-circuit being broken or short-circuited, in which cases an extremely high and dangerous electromotive force is produced in either the energizing-coil or the armature-coils, or both. The stationary copper ring forming the bobbin N, surrounding the revolving inductor, is a safeguard against the production of this electromotive force, inasmuch as the great change in the magnetic-field force due to an accident, such as just referred to, results in the induction of a large current in the copper ring forming the bobbin, instead of acting on parts which might and probably would be injured thereby. The presence of the copper ring forming the bobbin does not, however, interfere with the normal action of the machine, inasmuch as the flux through it at that time is practically steady and continuous. Of course, so far as the safeguard is concerned, it is not necessary to have the copper ring, which so acts, in the form of a bobbin. We, however, prefer it in that form, as it then serves the double function of a mechanical safeguard and support for the energizing-coil and at the same time acts as an electrical safeguard to the coil N and to other parts of the machine.

What we claim as our invention, and desire to secure by Letters Patent, is—

1. In a dynamo-electric machine the combination of a revolving inductor with a stationary armature, an energizing-coil and stationary copper bobbin surrounding the revolving inductor, the bobbin carrying the energizing-coil, substantially as described.

2. In a dynamo-electric machine the combination of a revolving inductor having polar projections with a stationary armature, an energizing-coil and stationary copper bobbin surrounding the revolving inductor, the bobbin being of less internal diameter than the diameter of the circle described by the polar projections, substantially as described.

3. In a dynamo-electric machine the combination of a revolving inductor having polar projections with a stationary armature, an energizing-coil and stationary copper bobbin surrounding the revolving inductor, both being of less internal diameter than the diameter of the circle described by the polar projections, substantially as described.

4. In a dynamo-electric machine the combination of a revolving inductor having polar projections with a stationary armature, an energizing-coil, and a stationary copper ring surrounding the revolving inductor, substantially as described.

5. In a dynamo-electric machine the combination of a revolving inductor having polar projections with a stationary armature, an energizing-coil, and a stationary copper ring surrounding the revolving inductor and being of less internal diameter than the circle described by polar projections, substantially as described.

In witness whereof we have hereunto set our hands this 17th day of January, 1896.

JOHN F. KELLY.
CUMMINGS C. CHESNEY.
POMEROY W. POWER.

Witnesses:
A. C. CLARK,
A. C. BUNKER.